March 17, 1970     L. PHOENIX     3,501,650

SWITCHING CIRCUITS

Filed May 1, 1967

United States Patent Office 3,501,650
Patented Mar. 17, 1970

3,501,650
SWITCHING CIRCUITS
Lancelot Phoenix, Birmingham, England, assignor to Joseph Lucas (Industries) Limited, Birmingham, England, a British company
Filed May 1, 1967, Ser. No. 635,049
Claims priority, application Great Britain, May 27, 1966, 23,927/66
Int. Cl. H03k 17/00
U.S. Cl. 307—284                                   7 Claims

ABSTRACT OF THE DISCLOSURE

In a switching circuit in which a thyristor or similar device controls current flow through a load, the thyristor is switched off by a transformer having a winding connected across the load in series with the diode, means being provided whereby flux changes in the transformer core act through the winding and diode to turn the device off.

---

This invention relates to switching circuits of the kind in which current flow through a load is controlled by a bistable device in series with the load, the device having the property that once it is turned on it can only be turned off by reducing the current flowing through it below a threshold value.

The invention is particularly designed for use with thyristors, but is applicable to other devices where a similar turn-off problem exists, for example thyratrons and four-layer diodes. The invention seeks to provide improved means for turning the device off reliably.

According to the invention, a switching circuit of the kind specified includes a transformer having a winding connected across the load in series with a diode, and means whereby flux changes in the transformer core can act through said winding and diode to turn off said device.

Figure 1:
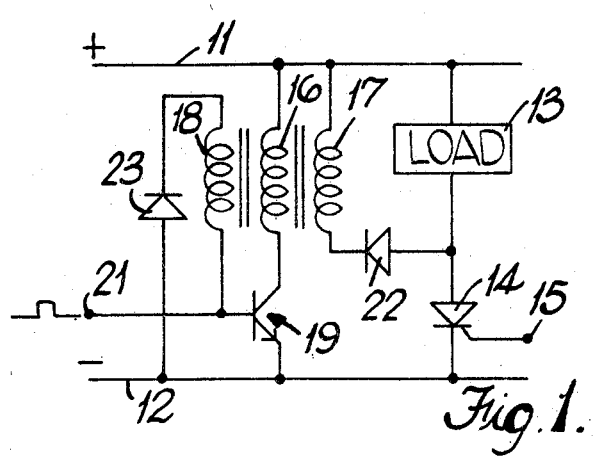
Figure 2:
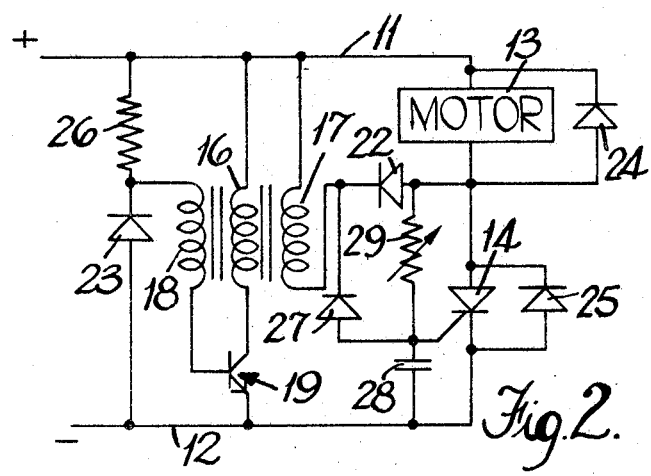
Figure 3:
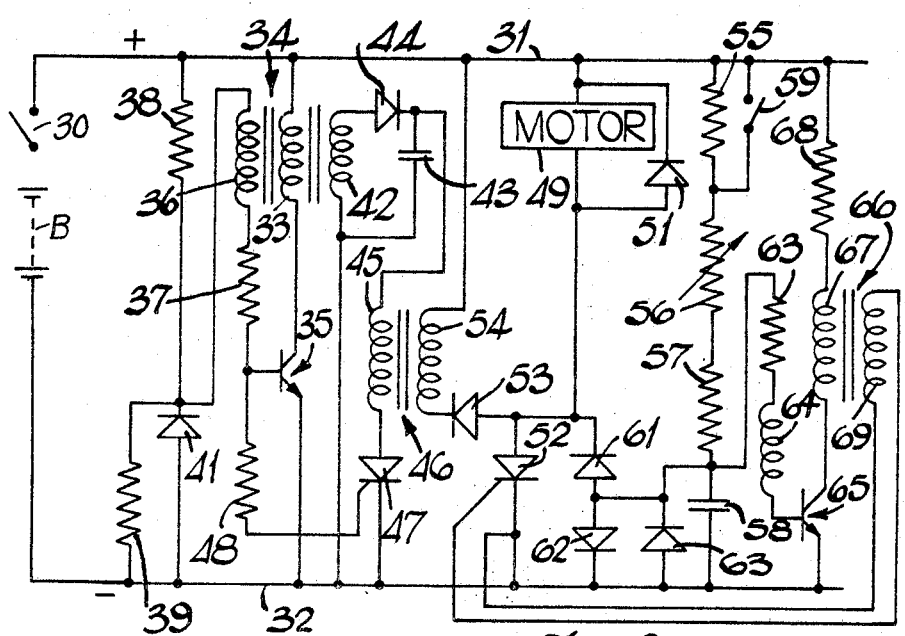

In the accompanying drawings, FIGURE 1 is a circuit diagram illustrating one example of the invention, and FIGURES 2 and 3 illustrate further examples suitable for controlling the traction motor of an industrial truck. Referring to FIGURE 1, there are provided positive and negative supply lines 11, 12, between which a load 13 is connected in series with the anode-cathode path of a thyristor 14. The gate of the thyristor is connected to a terminal 15 to which positive pulses are supplied when it is desired to turn the thyristor 14 on.

There is further provided a transformer having a primary winding 16, a secondary winding 17 and a feedback winding 18. The winding 16 has one end connected to the line 11, and its other end connected to the collector of an n-p-n transistor 19, the emitter of which is connected to the line 12, and the base of which is connected to a terminal 21 to which positive pulses are applied when it is desired to turn the thyristor 14 off. The winding 17 has one end connected to the line 11 and its other end connected through the cathode-anode path of a diode 22 to a point intermediate the load 13 and the anode of the thyristor 14, whilst the feedback winding 18 has one end connected to the base of the transistor 19, and its other end connected through the cathode-anode path of a diode 23 to the line 12.

The application of a positive pulse to the terminal 15 turns the thyristor 14 on, so that current flows in the load 13. The diode 22 prevents flow of current through the winding 17. When it is desired to turn the thyristor off, a positive pulse is applied to the terminal 21, so that the transistor 19 starts to conduct. Current builds up in the primary winding 16, and base current is fed back to the transistor 19 in known manner, the operation continuing until the core of the transformer saturates, at which point there is no further feedback and collapse of flux causes the diode 22 to conduct, the arrangement being such that the current flow through the thyristor 14 is reduced below its threshold value and the thyristor 14 turns off.

Numerous modifications can be made to the circuit. For example, the oscillator shown could be replaced by other oscillators of known form. Moreover, the transformer need not be part of an oscillator, but merely be operated by a pulse applied to its primary winding. The collapse of flux in the core can, by suitable design, be caused by saturation of the transistor 19 rather than the transformer, and moreover the circuit can be modified so that the rise of flux in the transformer core causes the thyristor to turn off.

FIGURE 2 illustrates a further example similar to FIGURE 1 in which the load 13 is a motor bridged by a diode 24 for conducting back E.M.F. a further diode 25 being provided with its cathode and anode connected respectively to the anode and cathode of the thyristor 14. The positive bias provided in FIGURE 1 at the terminal 21 is provided by connecting the junction of winding 18 and diode 23 to the line 11 through a resistor 26. Moreover, the cathode of the diode 22 is connected through the cathode-anode path of a further diode 27 to the gate of the thyristor 14, the gate being further connected to the line 12 through a capacitor 28, and to the anode of the diode 22 through a variable resistor 29. The thyristor is turned off as described with reference to FIGURE 1 and then is turned on after a delay during which the capacitor 28 charges through the motor 13 and the variable resistor 29. The mark-space ratio of current pulses in the motor 13 is determined by the value of the resistor 29, which can be coupled to the throttle pedal of an industrial truck driven by the motor 13. The capacitor 28 discharges through the diode 27 when the winding 17 produces an output, and the diode 25 is provided to limit the voltage at the anode of the thyristor, to permit energy in excess of that used to turn off the thyristor 14 to be fed to the battery which is used to power the motor 13, and to ensure that the capacitor 28 always discharges to the same level.

Referring now to FIGURE 3, there are provided positive and negative supply lines 31, 32 which in use are connected to the battery B of an industrial truck through a switch 30. Connected to the line 31 is one end of the primary winding 33 of a transformer 34, the other end of the winding 33 being connected to the line 32 through the collector-emitter path of a transistor 35. The transformer 34 includes a feedback winding 36 one end of which is connected through a resistor 37 to the base of the transistor 35, and the other end of which is connected to the line 31 through a resistor 38, and to the line 32 through a resistor 39 and the cathode-anode path of a diode 41 in parallel. Transformer 34 also incorporates a secondary winding 42, which is connected across a capacitor 43 through a diode 44.

One side of the capacitor 43 is connected to the line 32, and its other side is connected through the primary winding 45 of a transformer 46 to the anode of a thyristor 47, the cathode of which is connected to the line 32 and the gate of which is connected through a resistor 48 to the base of the transistor 35.

The traction motor 49 of the truck is bridged by a free-wheel diode 51, and has one side thereof connected to the line 31, and its other side connected to the anode of the thyristor 52, the cathode of which is connected to the line 32. The anode of the thyristor 52 is further connected to the anode of a diode 53, the cathode of which is connected to the line 31 through the secondary winding 54 of the transformer 46.

Connected in series across the lines 31, 32 are resistors 55, 56, 57 and a capacitor 58, the resistor 56 being variable and controlled by the throttle pedal of the truck, and the resistor 55 being bridged by a micro-switch 59 which closes as soon as the throttle pedal is depressed. The junction of the resistor 57 and capacitor 58 is connected to the anode of the thyristor 52 through the anode-cathode path of a diode 61, and is further connected to the line 32 through a pair of oppositely connected diodes 62, 63 in parallel. The junction of resistor 57 and capacitor 58 is further connected through a resistor 63 and transformer winding 64 to the base of a transistor 65, the emitter of which is connected to the line 32. The winding 64 forms part of a transformer 66 the primary winding 67 of which has one end connected to the collector of the transistor 65 and its other end connected through a resistor 68 to the line 31, and the secondary winding 69 of which has its ends connected to the gate and cathode respectively of the thyristor 52.

The transformer 34, transistor 35 and their associated components form a blocking oscillator of known form, as do the transformer 66, transistor 65 and their associated components. The operation of these oscillators will now be described in detail, but it should be noted that the circuit values are so chosen that the first oscillator (including transformer 34) operates at a relative low frequency, for example 50 c./s., whilst the second oscillator (including the transformer 66) operates at a considerably higher frequency. In use, when the supply is completed to the lines 31, 32 the capacitor 58 charges slowly, because at this stage the switch 59 is open. The second oscillator operates as soon as the capacitor 58 is charged, because at this stage there is a supply to the base of the transistor 65. Operation of the second oscillator provides a series of pulses to the thyristor 52, so that the thyristor 52 is fired and current flows in the motor 49.

Completion of the supply also causes operation of the first oscillator, and the energy stored in the core of the transformer 34 when the current is rising serves on collapse of the flux to charge the capacitor 43 through the diode 44. When the flux in the transformer 34 begins to rise, a signal is passed through the resistor 48 to the gate of the thyristor 47 to fire the thyristor 47, so that the capacitor 43 discharges through the winding 45 and thyristor 47 in series. The discharge of the capacitor 43 through the winding 45 acts through the transformer 46 to impress across the motor 49 a voltage which is in excess of the battery voltage, and so the thyristor 52 has its anode-cathode path reverse biased. The thyristor 52 is thereby turned off, so that the motor circuit is broken. It will be appreciated that on starting there will be a delay before the first turn-off pulse is received from the capacitor, and the purpose of the resistor 55 and switch 59 is to ensure that on starting the thyristor 52 is not turned on too soon.

During the period when the thyristor 52 is conducting, the capacitor 58 is held discharged by virtue of the diode 61. When the thyristor 52 turns off, the negative voltage which can appear across the capacitor 58 is restricted by the diode 63, and at the completion of the pulse from the transformer 46, the capacitor 58 starts to charge again through the potentiometer chain 55, 56, 57 it being understood that at this time the micro-switch 59 will be closed, short-circuiting the resistor 55. After a delay which is now determined by the position of the throttle pedal, which controls the value of the resistor 36, the thyristor 52 will again be fired so that the motor current will flow. If the time taken for the capacitor 58 to charge does not exceed the operating period of the first oscillator, the thyristor 52 is turned off at predetermined intervals determined by the first oscillator, and then is turned on again after a delay determined by the value of the resistor 56. The longer the delay, the shorter the period for which the thyristor is on before it is again turned off. When the motor current is required to be substantially zero, then the resistor 56 is varied so that the time taken for the capacitor 58 to charge does exceed the operating period of the first oscillator. The diode 62 limits the base-emitter voltage of the transistor 65 to a suitable level.

Having thus described my invention what I claim as new and desired to secure by Letters Patent is:

1. A switching circuit for controlling the mean current flow in a load comprising a D.C. source, a thyristor having its anode cathode part connected in series with said load across the D.C. source, means for supplying pulses to the gate of said thyristor to turn it on so that current flows in said load, a transformer having a primary winding and a secondary winding, a diode, a circuit connecting said diode across said load in series with said secondary winding, and the means for controlling the current flowing in the primary winding of said transformer, flux changes in the transformer impressing across said load a voltage in excess of the voltage across the load and thyristor, so that the thyristor is reverse biased and thereby turned off.

2. A circuit as claimed in claim 1 in which the thyristor is turned off by falling flux in the transformer core.

3. A circuit as claimed in claim 1 in which the thyristor is turned off by walling flux in the transformer core.

4. A circuit as claimed in claim 2 in which the transformer forms part of an oscillator.

5. A circuit as claimed in claim 2 in which said means for controlling current flow in the primary winding comprises a capacitor and oscillator operating in a cycle during which it charges a capacitor and then operates a switch to discharge the capacitor through said primary winding to turn the thyristor off.

6. A circuit as claimed in claim 5 in which said means for supplying pulses to the gate of the thyristor comprises an oscillator coupled to the gate, a capacitor which when discharged prevents operation of the oscillator, means for maintaining the capacitor discharged when the thyristor is conducting, and variable resistance means through which the capacitor is charged when the thyristor is turned off.

7. A circuit as claimed in claim 6 including means for delaying turn-on of the thyristor until the capacitor has been charged to a level to permit operation of its oscillator.

References Cited

UNITED STATES PATENTS

| | | | |
|---|---|---|---|
| 3,259,829 | 7/1966 | Feth | 307—252 XR |
| 3,359,484 | 12/1967 | Johnson | 307—252 XR |
| 3,431,436 | 3/1969 | King | 307—252 |

JOHN S. HEYMAN, Primary Examiner

S. T. KRAWCZEWICZ, Assistant Examiner

U.S. Cl. X.R.

307—252